(No Model.)

J. J. BLACK.
THILL COUPLING.

No. 437,882.    Patented Oct. 7, 1890.

Witness,
Louis R. Howlett.
A. H. Getchell.

Inventor,
John J. Black,
By Geo. W. Tibbitts atty.

UNITED STATES PATENT OFFICE.

JOHN J. BLACK, OF CLEVELAND, OHIO.

THILL-COUPLING.

SPECIFICATION forming part of Letters Patent No. 437,882, dated October 7, 1890.

Application filed May 23, 1890. Serial No. 352,825. (No model.)

*To all whom it may concern:*

Be it known that I, JOHN J. BLACK, a citizen of the United States, residing at Cleveland, in the county of Cuyahoga and State of Ohio, have invented certain new and useful Improvements in Thill-Couplings, of which the following is a specification.

This invention relates to coupling thills or poles to the front axles of carriages or wagons; and it consists of a device for rigidly attaching the thills or pole, yet enabling the thills or pole to be easily exchanged.

Figure 3:
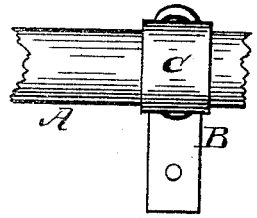
Figures 2, 4:
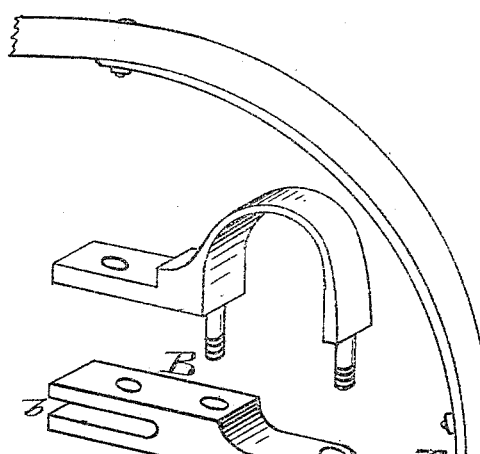
Figure 5:
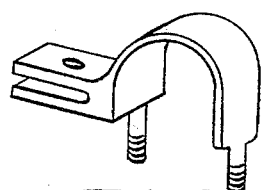
Figure 1:
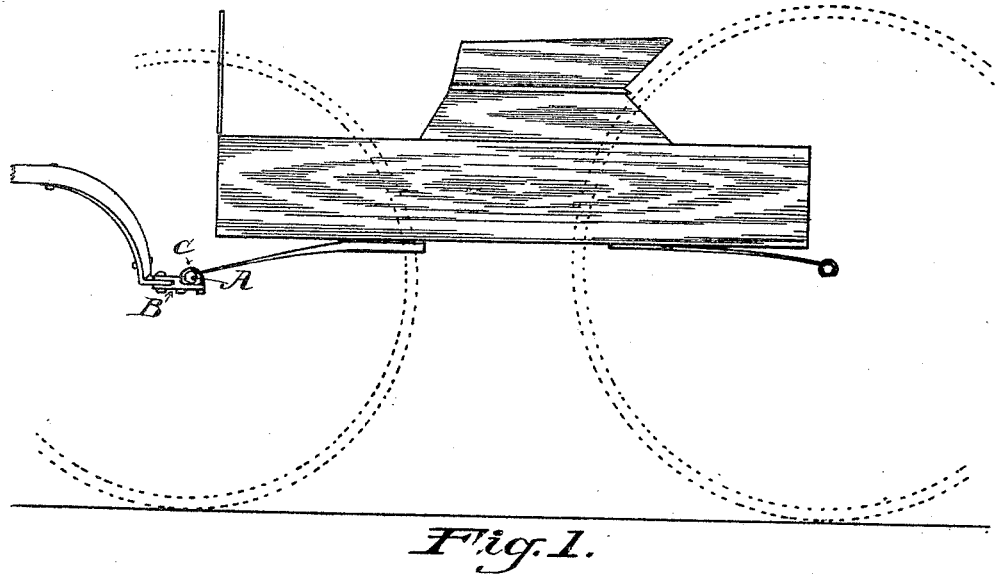

In the accompanying drawings, Figure 1 is a side elevation of a buggy having my improvement attached. Fig. 2 is an enlarged view of my improved coupler. Fig. 3 is a top or plan view of the same. Figs. 4 and 5 represent simple forms of the coupler.

A represents the front axle of a buggy or wagon.

B represents my rigid coupler for thills or pole, which I make of a bar of iron having a bifurcated forward end *b*, and having a reduced rear portion which connects with the axle, and is provided with holes for attaching it to the axle with a clip C. This bar may be made with the clip integral, as in Fig. 5, if desirable.

The thill or pole iron D has a lip or tongue *d*, made to fit in the bifurcated part of said bar B, for rigid attachment of the thills or pole to the coupling, and is firmly secured therein by means of a bolt and nut E. The coupling-bar B might be made with a single lip, but the bifurcated form is preferable for strength and for durability.

This kind of thill and pole coupling is designed for application to the front axles of carriages and wagons having the springs pivotally attached, as in my gear, for which a patent was granted November 13, 1888, No. 329,712.

The shifting or changing of thills for pole, or vice versa, by this means is readily seen to be that by simply withdrawing the bolts the thills or poles are easily exchanged, and that there is no liability of a rattling noise or wear.

Having described my invention, I claim—

1. The combination, with front axle and thills or pole, of a non-flexible coupling-bar rigidly attached to the axle and rigidly attached to the thills or pole, substantially as described.

2. The combination, with front axle and thills or pole, of a non-flexible bifurcated coupling-bar rigidly attached to the axle and rigidly attached to the thill-irons by bolts, substantially as described.

JOHN J. BLACK.

Witnesses:
GEO. W. TIBBITTS,
THOMAS C. WILLARD.